United States Patent [15] 3,690,040
Halfon [45] Sept. 12, 1972

[54] UNDERSEA LIFE SUPPORT SYSTEM
[72] Inventor: Albert Halfon, Niskayuna, N.Y.
[73] Assignee: Air Reduction Company, Incorporated, New York, N.Y.
[22] Filed: April 16, 1970
[21] Appl. No.: 29,216

[52] U.S. Cl. ..................................55/46, 55/198, 55/68
[51] Int. Cl. .............................................B01d 19/00
[58] Field of Search........55/68, 69, 80, 198, 208, 46; 203/11

[56] References Cited

UNITED STATES PATENTS 3,377,777   4/1968   Isomura..........................55/68
3,369,343   2/1968   Robb.............................55/158

Primary Examiner—Charles N. Hart
Attorney—H. Hume Mathews and Edmund W. Bopp

[57] ABSTRACT

A life support system for an undersea habitat which derives oxygen and potable water directly from the sea, without connection to shore or supply ships. Dissolved gases including oxygen and nitrogen, are stripped from sea water by passing a stream thereof in counter-current with rising steam derived from sea water heated in the boiler of a rectification tower. Oxygen is then separated from the other desorbed gases and conveyed to the habitat. The exhaust gas from the habitat is passed through a carbon dioxide absorber before being recirculated in the habitat. The carbon dioxide from the absorber and the residue of desorbed gases from the stripper, including nitrogen, are reabsorbed in the sea water, which is ultimately cooled and returned to the ocean.

11 Claims, 3 Drawing Figures

INVENTOR
ALBERT HALFON
BY
ATTORNEY

UNDERSEA LIFE SUPPORT SYSTEM

BACKGROUND OF THE INVENTION

This relates in general to techniques and equipment for supporting human life in an isolated, totally enclosed environment; and more particularly, to methods and apparatus for supplying life supporting gas and potable water to a deep sea habitat.

An application for patent entitled "Life Support System Using Solvent Extraction" is filed at even date herewith by Albert Halfon and Walter S. Moen.

A variety of techniques for life support in an isolated closed environment have been developed in the prior art, for such applications as space crafts, submarines, and underwater habitats.

In prior art space craft applications, oxygen is usually supplied initially to the capsule from a cryogenic source. Exhaust carbon dioxide may be concentrated by absorption using, for example, lithium hydroxide, silica-gel molecular sieves, or monoethanolamine. Oxygen may be reclaimed from the desorbed carbon dioxide by first using hydrogen to convert it to methane and water, from which the product oxygen is obtained by electrolysis. In accordance with other methods, oxygen is sometimes reclaimed directly from the desorbed carbon dioxide by electrolysis, leaving free carbon.

In prior art submarine applications, oxygen has been conventionally supplied by first distilling sea water and electrolysing the distilled water, returning the hydrogen to the sea. The exhaust carbon dioxide is conventionally disposed of by absorption in a molecular sieve or monoethanolamine, after which it is pumped back into the sea.

In underwater habitats of the type used in saturation diving programs, the oxygen is conventionally supplied from high pressure storage cylinders outside of the habitat, or by shore-based supplies through an umbilical-type hose. Carbon dioxide is conventionally removed by lime or lithium hydroxide absorption. Another possible prior-art practice has been to use potassium oxide $K_2O$ to both supply oxygen and absorb carbon dioxide. A further prior art alternative has been to use chlorate candles for supplying oxygen.

In accordance with two of the more recent prior art methods for supply of oxygen and disposal of carbon dioxide to closed undersea environments, sea water is used as the working medium. In accordance with one approach, stale air is pumped out of the undersea chamber through a venturi scrubber. This subjects the air to intimate contact with a fine spray of sea water, causing the oxygen dissolved in the sea water to diffuse into the oxygen-depleted air, and the carbon dioxide to be absorbed by the sea water, the refreshed air being returned to the chamber. In accordance with another approach, semipermeable membranes are used whereby oxygen and carbon dioxide are exchanged with sea water by selective diffusion through the membrane.

Each of the aforesaid systems has certain inherent difficulties which would prevent its adaptation to a large scale undersea installation of the type contemplated in connection with the present invention. For example, the cryogenic storage of oxygen and lithium hydroxide absorption of carbon dioxide, such as used in prior art space capsules, would be impractical for undersea installations of the type contemplated by the present invention because of the logistics required for supply and storage. The production of oxygen by electrolysis of distilled water involves operational hazards at high pressures. Moreover, the pumping of carbon dioxide at high pressure into the sea would cause bubble formation, which is undesirable in applications where secrecy is desired. The venturi scrubber technique would necessitate the handling of very large volumes of sea water to produce the desired supply.

Accordingly, a principal object of the present invention is improvement in techniques and equipment for supplying life supporting gas and potable water to a closed, isolated environment applicable both to one atmosphere and hyperbaric environments. A more particular object is to provide a life support system peculiarly adapted to maintain a large-scale manned undersea installation having extended working spaces at about atmospheric pressure or above, without the usual umbilical connections to ship or shore, or without the generation of tell-tale exhaust bubbles which might give rise to detection.

BRIEF DESCRIPTION OF THE INVENTION

These and other objects are realized in the system of the present invention in which life supporting oxygen and potable water are supplied to a closed, isolated undersea environment; and carbon dioxide is eliminated therefrom. This process is carried out by stripping dissolved gases from sea water by means of steam generated by boiling sea water, and separating and condensing the steam from the desorbed gases for use as potable water. Commercially pure oxygen for the closed environment is recovered from the desorbed gases; and the waste gases, including waste carbon dioxide derived from the closed environment, are ultimately reabsorbed in the stripped sea water for return to the sea.

The sea water, which is initially at a pressure dependent on the depth of the sea above the installation floor, is first passed through a turbine to reduce its pressure. It is then heated in several steps of countercurrent heat exchange with returning streams of stripped sea water, after which it flows into the top of the gas stripped column in which it moves down the column in countercurrent with steam generated by boiling sea water. Dissolved gases, including oxygen, carbon dioxide, and nitrogen, are stripped from the sea water by the steam, passing out the top of the stripper column. The desorbed gases from the stripper column are then passed through means for condensing out the steam, which provides potable water for the manned installation. The dried stream of desorbed gases then passes to an oxygen separation system, which may be any conventional type of cryogenic system designed to supply commercially pure oxygen to the installation.

After the stripped sea water flows from the stripper column into the boiler to provide steam, the hot liquid from the boiler passes through several heat exchange steps where it is cooled in countercurrent with the incoming sea water stream, thus effecting an overall heat conservation for the system. This cooled, stripped sea water stream then passes into an absorber column where waste streams of nitrogen and carbon dioxide, returning from the system, are absorbed, after which the stream containing the dissolved waste gases is chilled in a refrigeration unit, before return to the sea.

The principal advantages of the processes and systems of the present invention are:

1. they provide a substantially self-sufficient, habitable, deep sea environment, requiring no connection to ship or shore, except possibly to a source of power;
2. they combine the function of supplying life supporting oxygen to the undersea habitat with that of supplying potable water, and the elimination of carbon dioxide;
3. they are substantially free from bubbles from exhaust carbon dioxide, which might lead to detection;
4. they make use of the unlimited supplies and sinks available in the open sea;
5. they employ commercial techniques which have already reached a high degree of development for other applications; and
6. they provide means for controlling humidity in the habitat, as desired for comfort, and eliminating contaminants, such as carbon monoxide and hydrocarbon odors which may be dangerous in a closed system.

These and other objects, features, and advantages will be apparent to those skilled in the art from a study of the detailed specification hereinafter, with reference to the attached drawings.

SHORT DESCRIPTION OF THE DRAWINGS

Figure 1:
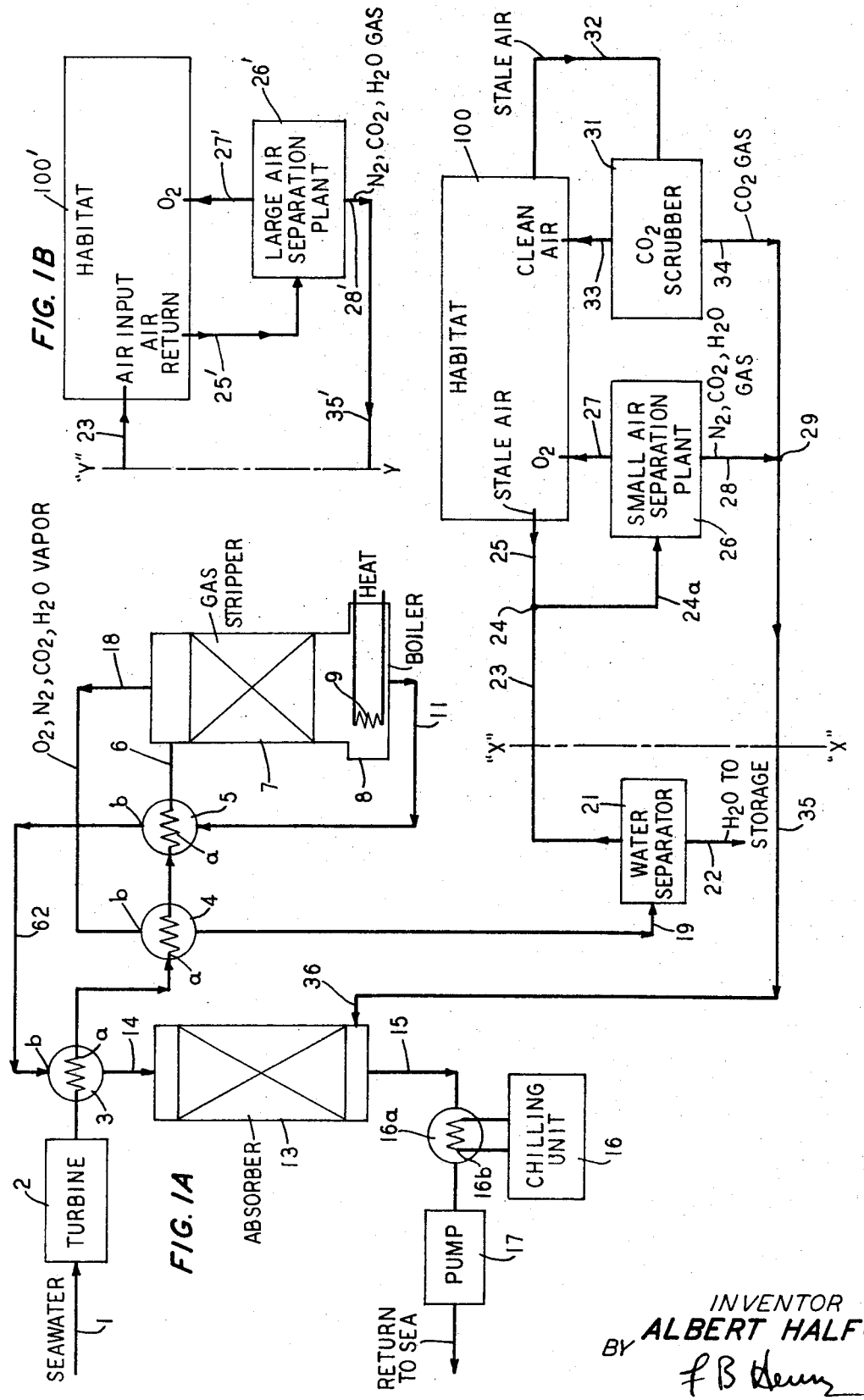
FIG. 1A is a schematic showing of one embodiment of a system in accordance with the present invention.
FIG. 1B is a modification of the system of FIG. 1A in which a single, large air separation plant replaces a smaller air-separation plant in combination with a carbon-dioxide scrubber, as shown in FIG. 1A.

Referring now to FIG. 1A of the drawings, there is shown a schematic flow diagram of the gas and potable water support system of the present invention, which is designed to service an extended, manned undersea Habitat 100. It will be assumed, of course, that the system indicated in FIG. 1A is housed inside a multiwalled enclosure of high strength steel, which is suitably built in a manner well known in the art to sustain the undersea pressures at the depth of operation.

Entering the walls of the enclosure is a sea water conduit 1 which passes in through a conventional water-tight seal. This carries sea water, flowing at the rate which will be discussed hereinafter, and at a pressure and temperature dependent upon the depth at which the Habitat 100 rests. The stream of sea water in the conduit 1 passes into a conventional turbine 2 which serves to reduce the pressure to a value which exceeds the pressure of one atmosphere, maintained in the Habitat 100, by an amount which is equal to the contemplated pressure loss as the stream passes through the system. From the turbine 2, the sea waster stream passes at a temperature of, say, 40° F. through column $a$ of a first heat exchanger 3 which may be, for example, of a conventional shell-and-tube type, wherein the sea water stream is warmed in a countercurrent heat exchange with a stream of sea water passing through column $b$ into the absorber 13, from the initial temperature of the ocean depths surrounding the habitat, to a temperature of, say, 50° F. The sea water feed stream then passes into column $a$ of a second heat exchanger 4 where it is further heated to a temperature of, say, 62° F. by the condensation of steam passing from the outlet pipe 18 of the gas stripper 7, and into column $b$ of that heat exchanger in a manner to be described. The output of column $a$ of the second heat exchanger 4 passes into column $a$ of third heat exchanger 5, where it is further heated to a temperature of, say, 205° F. in an exchange with hot water derived from the boiler 8 of the gas stripper 7. This stream then passes through the inlet 6 to a point near the top of the gas stripper column 7. The latter may be of any of the types of stripping columns well known in the art.

In the gas stripper 7 the stream of sea water then falls down by the force of gravity in countercurrent with steam rising from the boiler 8, whereupon dissolved gases therein, including oxygen, nitrogen, and carbon dioxide, are stripped from the falling stream of sea water by rising steam. The latter is generated by means of a heater 9 connected to a conventional source of power, not shown, which vaporizes the water in the boiler. The sea water at the bottom of the boiler, which has been stripped of dissolved gases, then passes out through the outlet 11 at approximately 215° F., flowing into column $b$ of the third heat exchanger 5 where it gives up heat to the incoming feed stream, subsequently passing into column $b$ of the first heat exchanger 3, where it gives up additional heat to the incoming feed stream, eventually passing into absorber 13 through the inlet pipe 14. The latter may be of any of the types well known in the art.

The absorber 13 functions as a reservoir of the stripped sea water into which is dissolved the waste gases from the rest of the system, in a manner to be described hereinafter.

Returning now to the gas stripper 7, the output stream of steam, including the gases, which have been stripped from the incoming stream of sea water, flows from the top through the outlet 18 at approximately the boiling temperature of water, passing through column $b$ of the second heat exchanger 4, where the steam is condensed in a heat exchange with the incoming feedstream. This stream, together with a stream of liquid condensate from the second heat exchanger 4 then passes through the inlet 19 into the water separator 21. This may take any of the forms well known in the art, such as, for example, a centrifugal rotating drum in which the liquid is collected on the periphery, passing down through the outlet 22 to a storage tank of potable water which serves to support life in the Habitat 100.

The stream of desorbed gases from which the water has been largely eliminated, now passes out through the upper outlet 23 and into the junction 24 where it is joined through conduit 25 by a stream of exhaust air, from the atmosphere of the Habitat 100. The stream of exhaust air from the Habitat, together with the fresh stream of desorbed gases, then passes through the input 24$a$ of the air separation plant 26. The latter may be a cryogenic air separation system of any of the types well known in the art.

The output from the top of the air separation system 26 is commercially pure oxygen. This oxygen stream flows out through the outlet 27 at a flow rate and temperature which will be discussed presently, and at a pressure of substantially one atmosphere in the example under description. The remaining gases from the air separation plant, which include nitrogen, carbon dioxide, and a small amount of water vapor, pass in a stream through the conduit 28 to a junction 29. In addition to fresh oxygen from the outlet 27, air, comprising a substantially conventional mixture of 21 percent oxygen and 29 percent nitrogen, which has been substantially cleansed of carbon dioxide, passes into the Habitat 100 through the outlet 33 of a carbon dioxide scrubber 31, which receives, at inlet 32, stale air flowing in from the Habitat 100. This exhaust air contains approximately 1% by volume of carbon dioxide. The scrubber 31, which may be of any of the types well known in the art, eliminates all the carbon dioxide, except between about 0.3 and 0.5 percent by volume, which remains in the cleansed stream, passing into the habitat through the outlet 33. The carbon dioxide residue then passes from the scrubber 31 through the outlet 34, and into the junction 29 where it becomes part of the stream of waste gases from the system, including nitrogen, carbon dioxide, and water vapor. This stream then flows through the conduit 35 into the inlet 36 of the absorber column 13. Here, these waste gases are reabsorbed into the stripped sea water, which has flowed in through the intake pipe 14.

The stream of sea water, containing the reabsorbed gases, then passes out through the outlet 15 and through a refrigeration unit 16a which is serviced by a coil 16b which is connected to a refrigeration system 16 of any of the types well known in the art, which serves to cool the stream to approximately the temperature of the surrounding sea water. After the stream of sea water, which has reabsorbed the waste gases from the system, has been cooled to the desired temperature, it is pumped out by means of the pump 17 to return to the sea, with which it is integrated without the presence of any tell-tale bubbles.

In accordance with a modification of the system of FIG. 1A the section to the right of the dotted lines XX is replaced by the section to the right of dotted lines YY, as indicated in FIG. 1B.

In the modified system of FIG. 1B, the stream of desorbed gases from water separator 21 passes out through conduit 23 and directly into Habitat 100'. An air return conduit carries stale air returning from the Habitat 100'. This stream then passes into the air separation plant 26', which is of a type sufficiently large to clean carbon dioxide, water vapor, and hydrocarbons out of the air input from 25'; sending a stream of pure oxygen into the Habitat 100' through conduit 27'; this provides a balance between oxygen and nitrogen in the Habitat 100' which is roughly the same as that in the atmosphere.

Figure 2:
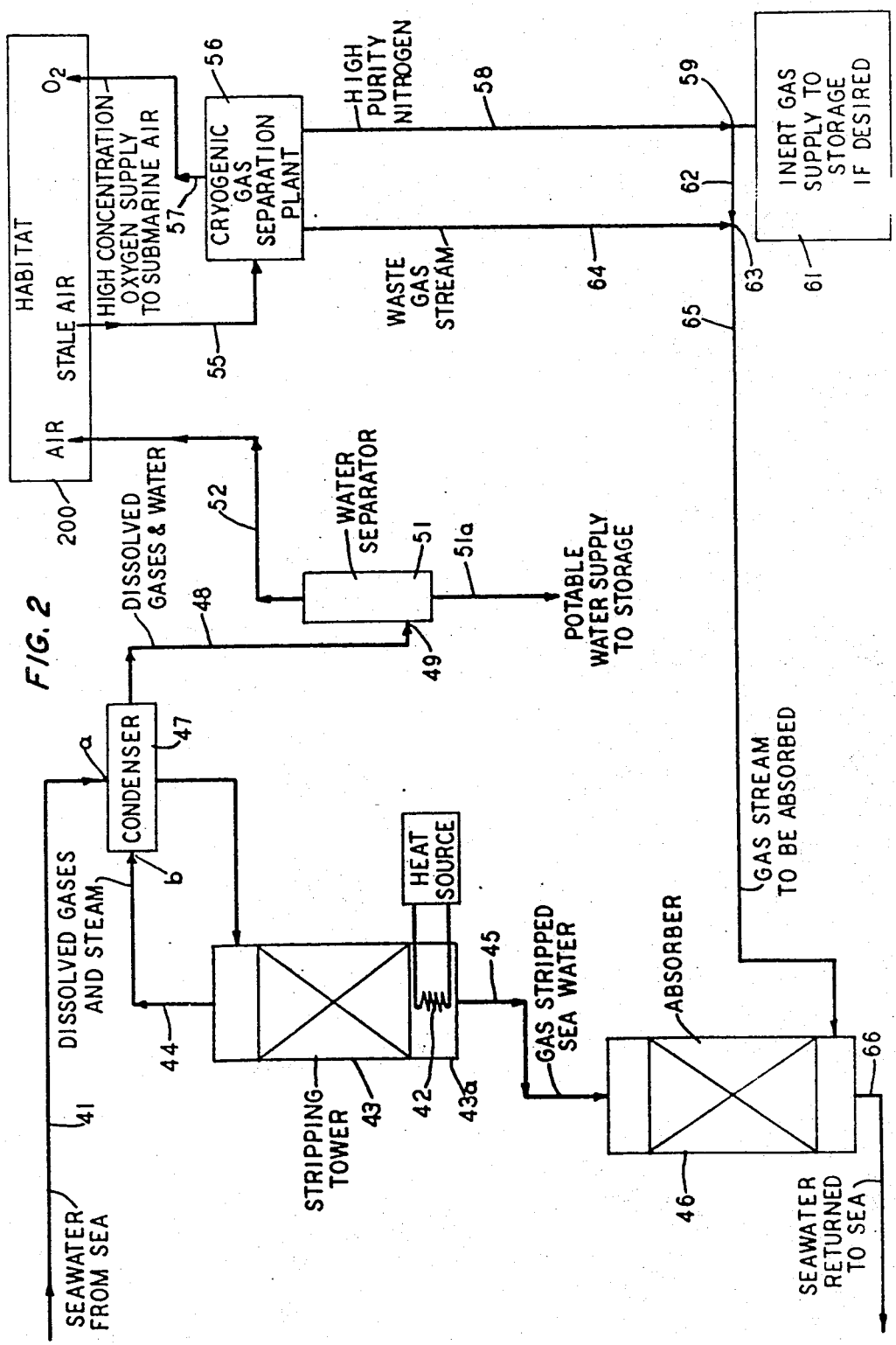
FIG. 2 is a schematic showing of a second embodiment of a system in accordance with the present invention.

Referring now to FIG. 2 of the drawings, there is shown an alternative improved system in accordance with the present invention wherein the carbon dioxide and the other waste gases are all removed in a single cryogenic gas separation plant. Sea water passes in through a conduit 41 and through coil 47a of condenser 47, where it is warmed up in a heat exchange with vapors passing out of the stripping tower 43 through conduit 44. The warmed input stream then passes into the upper part of a stripping tower 43 which is similar to the gas stripper 7 of the previous embodiment, the sea water falling to the bottom by the force of gravity in a countercurrent exchange with rising steam from the boiler 43a, in which heat is generated by a heat coil 42 in the manner previously described. The rising steam causes the dissolved gases to be stripped out, and to pass out through the upper conduit 44, as in the previous embodiment. The gas-stripped sea water passes out of the bottom of the boiler 43a through the conduit 45, from which it passes directly into the top of the absorber 46, which functions substantially in the manner previously described with reference to the absorber 13.

The desorbed gases, together with steam from the stripping tower 43 passing out of the upper outlet 44, include oxygen, nitrogen, carbon dioxide, and steam. This steam passes through coil 47b of condenser 47 where the steam is condensed in a heat exchange with the stream of incoming sea water in conduit 41, as previously indicated. The stream of desorbed gases, from which most of the steam has been condensed, passes through the conduit 48 and into the inlet 49 of a water separator 51, which may be of any of the types well known in the art, such as a centrifugal separator. The water collected in separator 51 passes out through the lower outlet 51a into the potable water storage, as previously described.

The desorbed gases, oxygen, nitrogen, and carbon dioxide, then pass through conduit 52 leading from the center of the centrifugal separator and directly into Habitat 200. A stream of recirculated air from Habitat 200 passes through the conduit 55 and into the cryogenic gas separation plant 56 which is of a form well known in the art. The cryogenic plant 56 is designed to separate out and return to the Habitat 200 through the conduit 57, a supply of commercially pure oxygen. It will be apparent that the input flow to Habitat 200 through conduits 52 and 57 must equal the output flow of recirculated air through conduit 55 in order to maintain the proper oxygen-nitrogen balance in the Habitat 200.

In addition, a stream of high purity nitrogen is separated out in this cryogenic system, passing out through conduit 58. Part of this stream may be employed to contribute a balance of about 79 percent nitrogen to the 20 percent oxygen in the simulated air which passes into the habitat through conduit 57; or it may be passed through junction 59 to an inert gas storage vessel 61. The remainder of the high purity nitrogen passes out of junction 59 and through the conduit 62 to a junction 63. Here, the stream of waste nitrogen is joined by a stream of additional waste gases, including carbon-dioxide, passing into the junction 63 through the conduit 64. The merged waste gas stream then passes through conduit 65 and and into the inlet of absorber 46 where it is reabsorbed into the gas-stripped sea water which flows into the absorber through conduit 45. The stream of sea water containing reabsorbed gases then passes out through the conduit 66, and ultimately into the sea after optional cooling, in the manner indicated with reference to the previous figure.

Quantitative values for a specific example employing the system of the present invention as derived from the following computations.

CONVENTIONAL U. S. NAVY PRACTICE FOR SUBMARINE ATMOSPHERE

Control Systems
  A. Oxygen Supply
    Electrolytic Oxygen Generator
      $O_2$ capacity = 120 standard cubic feet per hour (at 70° F., 1 atmosphere)
      volume = 175 cubic feet
      weight = 15,500 pounds electric power = 70 kilowatts.
  B. Carbon Dioxide elimination, by scrubbing with monoethanolamine absorber:
      $CO_2$ concentration (input from Habitat) = 1 percent (by volume)
      $CO_2$ concentration (exhaust returned to Habitat) = 0.3–0.5 percent (by volume)
      Air flow = (250 st. cu. ft./min.) = (15,000 st. cu. ft./hr.)

TYPICAL DESIGN IN ACCORDANCE WITH PRESENT INVENTION

Sea Water Requirement
  To provide 120 standard cubic feet per hour of $O_2$ into Habitat through conduit 57 (see FIG. 2):
  At saturation there are $10^{-5}$ grams $O_2$ per 1 gram of sea water = 10/1,000,000
    1. At worst condition, 40 percent saturation = (4 parts $O_2$/1,000,000 parts $H_2O$) (by weight)
    2. 120 standard cubic feet per hour $O_2$ = 10 pounds per hour $O_2$.
  Substituting (2) in (1):
    3. Sea water input required (into conduit 41) = (10 lbs. $O_2$/hr) × (1,000,000 lbs. $H_2O$/4 lbs. $O_2$) (2,500,000 lbs./hr.) = 5,000 gallons per minute of sea water.
  Assume difference in temperature between water flowing in and water flowing out, to be 10° F:
    4. Heat required = 10° F. × 2,500,000 (lbs./hr.lb.) × (BTU/°F.) = 25,000,000 (BTU/hr.)
    5. Since 1,000 BTU's are required for 1 pound of steam, then:
      25,000,000 (BTU/hr.) produce (25,000 lbs. steam/hr.)
  Converting (BTU's/hr. to kilowatts:
    (25,000,000/3,412) (BTU/hr.) = 7,327 kilowatts.
  Cryogenic Plant Requirements
    Assuming the liquid-to-vapor ratio in the stripping column to be 0.1, then:
    6. Flow rate of stripped gas (through conduit 44 at outlet of stripper 43) = (120/0.1) = 1,200 standard cubic feet per hour.
    7. Flow rate for atmospheric recycle (through intake conduit 52 into separation plant 56) (assuming 30 percent consumed) = 15,000 × (0.7/1.0) = 10,500 standard cubic feet per hour.
  Total flow of air and $O_2$ from cryogenic plant 56 into habitat chamber through outlet 57 = 1,200 plus 10,500 = 11,700 standard cubic feet per hour.
    Ratio to 25 ton/day $O_2$ plant = (11,700/131,000) = 0.0894.
    Power for 25 ton/day cryogenic plant = 1,100 kilowatts.
    Power for presently disclosed cryogenic plant 56 is roughly proportional, being 0.0894 × 1,100 = 100 kilowatts required.

Total power required to operate system, such as disclosed in FIG. 2 = 7,327 + 100 = 7,427 kilowatts.

The present invention is not to be construed as limited by the specific combinations disclosed herein by way of illustration. Moreover, the scope of this invention is to be construed only in accordance with the appended claims.

What is claimed is:

1. An undersea system for supplying life supporting fluids including oxygen to a habitat beneath the sea, and eliminating metabolic carbon dioxide from said habitat which comprises in combination:
  means for receiving a stream of sea water from the sea surrounding said habitat,
  stripping means including a boiler connected to said receiving means for stripping dissolved gases including oxygen, nitrogen and carbon dioxide from said stream of sea water by contacting said stream of water with steam generated by boiling said stream of sea water in said boiler,
  separating means for separating out at least one breathing stream comprising a substantial proportion of oxygen from said stripped gases and supplying said stream of breathing gas to said habitat,
  means for continuously removing waste gases including nitrogen and carbon dioxide from the gas in said habitat, and
  means for returning removed waste gases including nitrogen and carbon dioxide for reabsorption into the stripped stream of sea water for return to the sea.

2. An undersea system for supplying life supporting fluids including oxygen to a habitat beneath the sea, and eliminating metabolic carbon dioxide from said habitat which comprises in combination:
  means for receiving a stream of sea water from the sea surrounding said habitat,
  stripping means connected to said receiving means for stripping dissolved gases including oxygen from said stream of sea water,
  separating means for separating out at least one breathing stream comprising a substantial proportion of oxygen from the balance of said stripped gases and supplying said stream of breathing gas to said habitat,
  purifying and absorbing means connected to receive a stream of exhaust gas from said habitat for purifying said exhaust gas and absorbing waste gas including carbon dioxide from said stream of exhaust gas before returning said last-named stream to said habitat,
  means connected to receive said waste gases from said purifying and absorbing means and for receiving said stripped sea water from said stripping means, for reabsorbing said waste gases in said stripped sea water, and
  means for returning said sea water stream including said waste gases to the sea.

3. An undersea system for supplying life supporting means including oxygen and drinking water to a habitat beneath the sea which comprises in combination:
  means for continuously deriving a stream of sea water,
  an extracting tower including a boiler,
  means for introducing said stream of sea water into said tower for countercurrent exchange with steam rising in said tower from said boiler for stripping the dissolved gases from said seawater, a condenser connected to condense the said steam from said stripped gases, water separation means connected to receive the condensed water vapor and gas from said condenser for separating out and storing condensed water of potable grade from said stripped gases derived from the top of said tower, gas separation means connected to continuously receive a stream of air from said habitat including the stripped gases from said water separation means for separating out separate streams of gas including a stream of high purity oxygen from said stripped gases, leaving a residue of waste gases, including carbon dioxide, and to deliver said stream of oxygen to said habitat, a final absorbing column connected to receive water from said boiler, and to receive said residue of waste gases including carbon dioxide from said gas separation means for reabsorbing said gas in said water, and means for returning said water including said absorbed gases to the sea.

4. The combination in accordance with claim 3 including heat exchanger means connected to warm said incoming stream of sea water ahead of said extraction tower, said means comprising three heat exchangers, the first and third of said heat exchangers being warmed by hot water returning from the boiler of said extraction tower, and the second said heat exchanger being warmed by vapor including steam from the top of said extraction tower.

5. The combination in accordance with claim 3 wherein said gas separation means comprises an air separation plant for separating out and delivering to said habitat a stream of high purity oxygen, and a carbon dioxide scrubber for removing impurities including carbon dioxide from a stream of air recirculated through said scrubber from said habitat.

6. The combination in accordance with claim 3 wherein said gas separation means comprises a single system for receiving recirculated air from said habitat including the stripped gases from said water separation means for separating out a plurality of separate streams including commercially pure oxygen delivered to said habitat, high purity nitrogen for storage, and waste gas including carbon dioxide.

7. A method for supplying life supporting oxygen to a habitat beneath the sea and for eliminating metabolic carbon dioxide from said habitat which comprises the steps of:

deriving a stream of sea water from the sea surrounding said habitat, stripping dissolved gases including oxygen, nitrogen and carbon dioxide from said stream of sea water by contacting said stream of water with steam generated by boiling said stream of sea water, separating out at least one breathing stream comprising a substantial proportion of oxygen from said stripped gases and supplying said breathing stream to said habitat, continuously removing waste gases including nitrogen and carbon dioxide from said habitat through purification means, reabsorbing waste gas including nitrogen and carbon dioxide into said stream of stripped sea water, and returning said sea water stream including said waste gases to the sea.

8. A method of supplying life supporting oxygen to a habitat beneath the sea and for eliminating waste gases including metabolic carbon dioxide from said habitat which comprises the steps of:

deriving a stream of sea water, introducing said sea water into an extraction column for stripping said sea water of dissolved gases, including oxygen, nitrogen, and carbon dioxide, by countercurrent exchange with water vapor rising from a boiler in said extraction column, returning hot water from said boiler into a final absorption column, condensing the water vapor from a stream of stripped gas including oxygen, nitrogen, carbon dioxide, and water vapor flowing from said extraction tower and separating out the water from said stream, separating a stream including said stripped gases and exhaust air derived from said habitat into a plurality of streams of which a stream of commercially pure oxygen is directed into said habitat, and at least one additional stream including waste gases and carbon dioxide are returned for final reabsorbtion in a stream of water from said boiler, and returning said stream of water including the reabsorbed waste gases to the sea.

9. A method in accordance with claim 8, the steps of warming up the sea water ahead of the stripping step by separate steps of heat exchange with hot water from the boiler of said extraction column, and hot vapor including steam from the top of said extraction column.

10. A method in accordance with claim 8 wherein the said stripped gases and exhaust air derived from said habitat are separated in a first air separation step wherein a stream of commercially pure oxygen is directed into said habitat, leaving a residue stream of waste gases, and in a separate second step exhaust air from said habitat is continuously scrubbed in a carbon dioxide scrubber, directing a stream of purified air into said habitat and leaving a residue stream comprising essentially carbon dioxide, said residue streams of waste gas and carbon dioxide being combined for return to the sea in said final reabsorbtion step.

11. A method in accordance with claim 8, wherein said stripped gases and exhaust air from said habitat are separated in a single gas separation system from which a stream of commercially pure oxygen is directed into said habitat, a stream of high purity nitrogen is at least partially directed to storage, and a waste gas stream including carbon dioxide and the remainder of said nitrogen stream are combined for return for said final absorption step.

* * * * *